Dec. 3, 1935.  E. A. ROSIN  2,022,739

CUTTING APPARATUS

Original Filed Sept. 21, 1931  2 Sheets-Sheet 1

Inventor
EDWIN A. ROSIN.
Frank Fraser
Attorney

Dec. 3, 1935.   E. A. ROSIN   2,022,739
CUTTING APPARATUS
Original Filed Sept. 21, 1931   2 Sheets-Sheet 2
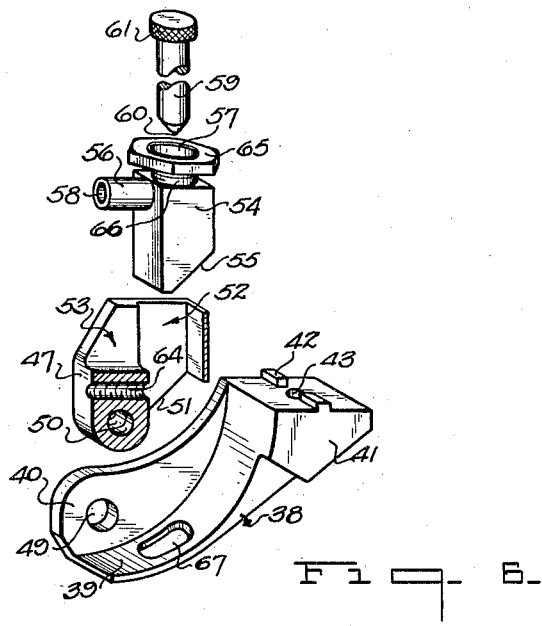
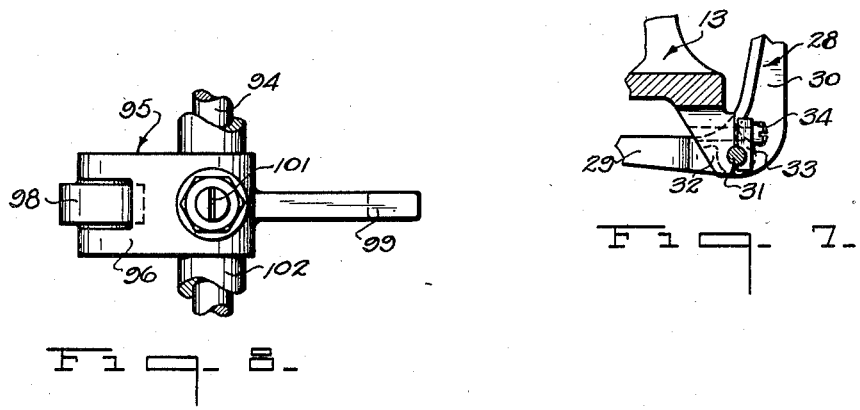
Inventor
EDWIN A. ROSIN.
By Frank Fraser
Attorney Patented Dec. 3, 1935

2,022,739

UNITED STATES PATENT OFFICE 2,022,739

CUTTING APPARATUS

Edwin A. Rosin, Toledo, Ohio, assignor to Libbey-Owens-Ford Glass Company, Toledo, Ohio, a corporation of Ohio Original application September 21, 1931, Serial No. 564,039. Divided and this application December 3, 1932, Serial No. 645,515

19 Claims. (Cl. 33—32)

This application is a division of my copending application entitled "Machine for cutting sheets of glass and the like", filed September 21, 1931, Serial No. 564,039.

The present invention relates broadly to apparatus for cutting flat sheets or plates of any desired material but is especially designed for use in the cutting of glass sheets when incorporated in the type of machine illustrated and described in my above-noted copending application. The primary object of this invention resides in the provision of cutting mechanism of novel and simplified construction which will lend itself to the cutting or scoring of the glass sheets in a positive, accurate and efficient manner.

Another important object of the invention is the provision of an improved form of cutting mechanism wherein the cutting tool is capable of a plurality of individual and independent adjustments which provide for any desired accurate setting thereof.

A further object of the invention is the provision of cutting mechanism of this character which will automatically adjust itself to glass sheets of different thicknesses without previous manual manipulation and also embodying means for yieldably maintaining the cutting tool in engagement with the glass sheet to automatically compensate for any inequalities in the surface thereof.

Other objects and advantages of the invention will become more apparent during the course of the following description when taken in connection with the accompanying drawings.

Figure 1:
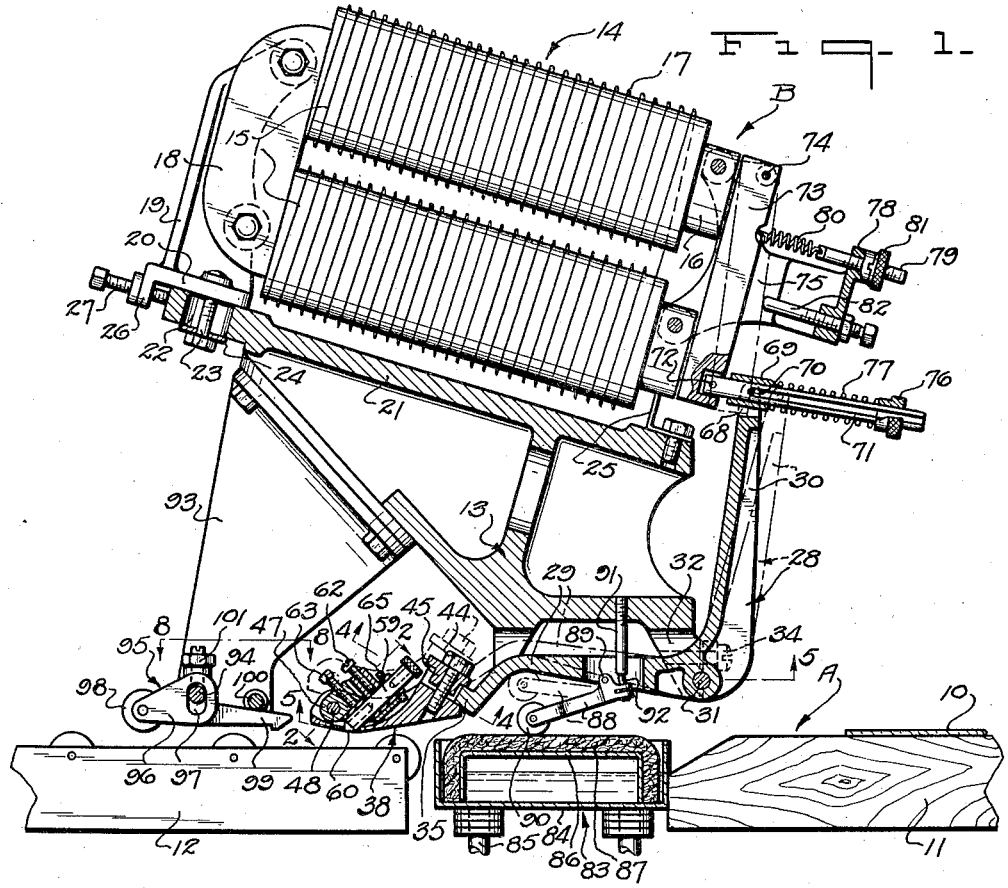
Figure 2:
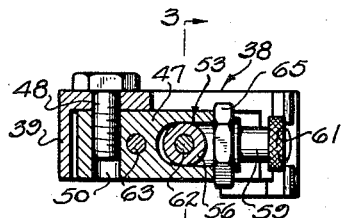
Figure 3:
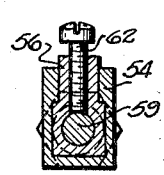
Figure 4:
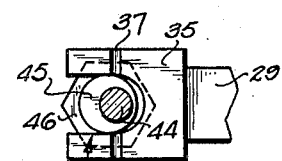
Figure 5:
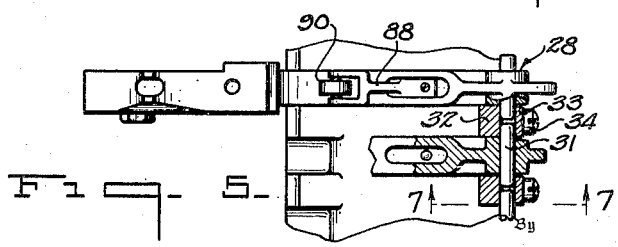

In the drawings forming a part of this application and wherein like numerals are employed to designate like parts throughout the same, Fig. 1 is a vertical longitudinal section through the cutting mechanism and associated parts of the apparatus, Fig. 2 is a section taken substantially on line 2—2 of Fig. 1, Fig. 3 is a section taken substantially on line 3—3 of Fig. 2, Fig. 4 is a section taken substantially on line 4—4 of Fig. 1, Fig. 5 is a section taken substantially on line 5—5 of Fig. 1, Fig. 6 is a perspective view, partially in section, of one of the cutter holder assemblies, Fig. 7 is a section taken substantially on line 7—7 of Fig. 5, and Fig. 8 is a plan view taken substantially on line 8—8 of Fig. 1.

Referring now to the drawings, the cutting apparatus illustrated therein includes generally a horizontal reciprocating cutting table A adapted to support the sheets or plates of glass 10 to be cut, and which is adapted to be movable back and forth in any desired manner beneath the cutting mechanism B which is mounted in a relatively fixed position above said table. That is to say, the cutting mechanism B remains stationary while the cutting table A is reciprocated therebeneath.

The particular construction of the cutting table A, together with the means for reciprocating the same, is fully illustrated and described in my above-identified copending application and will therefore be neither illustrated nor described in detail herein. Briefly stated, however, the cutting table A is divided longitudinally into two principal portions or sections 11 and 12 respectively, the former constituting the cutting section upon which the glass sheets 10 are supported during cutting, and the latter serving as a receiving section for receiving the glass from the cutting section after the cutting thereof as will be more fully hereinafter apparent.

The numeral 13 designates a cutter carrying cross member or beam extending transversely above the table A, the opposite ends of which may be supported by vertical stationary standards (not shown). Carried by said cross member are a series of cutting units arranged side by side transversely of the table, one unit only being herein illustrated and designated in its entirety by the numeral 14. The cutters are preferably, although not necessarily, spaced about one inch apart.

Each cutting unit 14 includes a pair of relatively thin electro-magnets 15 positioned one above the other and each consisting of a metal core 16 about which is wound the usual coil 17. The cores 16 for each pair of magnets form the customary horse-shoe magnet by being integral with their connecting member 18 which is secured to a bracket 19, said bracket being provided with a base portion 20 which is adapted to rest upon the inclined portion 21 of cross beam 13. This inclined portion has an opening 22 therein, and projecting upwardly through this opening is a bolt 23 threaded within the base portion 20 of bracket 19; a washer 24 bearing against the underside of inclined portion 21. By this means, the electro-magnets are rigidly secured to the cross beam, the forward ends of said magnets being supported upon plates 25. In order to effect proper positioning of the electro-magnets and also to prevent slipping thereof, the bracket 19 may be provided with a laterally offset ear 26 through which passes an adjusting screw 27 engaging the rear edge of inclined portion 21 of cross beam 13. By loosening the bolt 24 and adjusting screw 27, the proper positioning of the electro-magnets can be effected.

Each of the cutting units 14 also includes a substantially L-shaped lever 28 comprising a substantially horizontal tool supporting arm 29 and a substantially vertical arm 30, said lever being pivotally mounted intermediate its ends upon a horizontal pin 31. As best shown in Figs. 5 and 7, the L-shaped lever 28 of each cutting unit is carried upon an individual pin 31, said pin projecting beyond the lever at opposite sides thereof. The cross beam 13 is provided with a plurality of spaced depending ears 32, one of said ears being positioned between each pair of adjacent levers and constituting one-half of a bearing for the respective pin 31. A plate 33 constitutes the other half of the bearing, being secured to the respective ear by a screw or other fastening element 34. This construction is provided in order that any one of the levers 28 may be removed from the machine without disturbing the position or operation of the remaining levers. For instance, when it is desired to remove any one lever, it is simply necessary to remove the plates 33 at opposite sides of the said lever, whereupon the lever can be removed, after which the plates may again be secured in place.

The horizontal tool supporting arm 29 of lever 28 is provided with an offset foot 35 formed with an open slot 36 and having grooves 37 upon the lower face thereof. Carried by the offset foot is a shoe 38 comprising an arcuately shaped bottom plate or supporting portion 39 and a substantially vertically disposed flange 40 at one side edge thereof. The upper end of the shoe is formed with a head 41 having formed upon the flat upper surface thereof ribs 42 which fit within the grooves 37 in the offset foot 35. The body portion of the shoe also has a threaded opening 43 adapted to receive therein the securing element 44. This securing element is in the form of an ordinary bolt, and carried thereby and received within the slot 36 in foot 35 is an eccentric 45 formed with a wrench-engaging head 46 so that it can be readily turned. With such a construction, it will be apparent that upon loosening the bolt 44 and rotating the eccentric 45, the shoe 38 can be adjusted transversely with respect to the foot 35, the ribs 42 fitting within slots 37 serving to prevent any rotation of the said shoe.

Adapted to be supported upon the arcuately shaped bottom plate 39 of shoe 38 is a member 47 pivotally secured to the said shoe by means of a bolt 48 passing loosely through an opening 49 in flange 40 and threaded within an opening 50 in member 47. The bottom of the member 47 is bevelled as at 51, and extending vertically through the said member is a substantially square opening 52. The member 47 is also formed with a cut-out portion or recess 53 communicating with the opening 52. Adapted to be received within the opening 52 is a cutter holder 54, the bottom of which is likewise bevelled as at 55. The cutter holder 54 is also provided with a forwardly disposed stem 56, and when the cutter holder is inserted within the opening 52, this stem is received within recess 53. The cutter holder is provided with a vertical opening 57, and the stem 56 is also formed with an opening 58 communicating with the opening 57.

Adapted to be received within the opening 57 in cutter holder 54 is the cutting ferrule 59 carrying at its lower end a cutting diamond 60 and its upper end being formed with a knurled head 61, if desired, to facilitate turning of the ferrule within the opening 57 to adjust the position of the diamond. The cutting ferrule is secured within the holder 54 by means of a set screw 62 passing through the opening 58 in stem 56, while the holder 54 is secured within the opening 52 by a set screw 63 threaded through opening 64 in member 47.

The cutter holder 54 is supported within the member 47 by means of a nut 65 threaded upon the upper cylindrical end 66 of holder 54, said nut resting upon the top of member 47. Upon loosening of the set screw 62, the cutting ferrule 59 can be rotated within opening 57 to facilitate proper positioning of the cutting diamond. Likewise, upon loosening of set screw 63 and rotation of nut 65, the cutter holder 54 can be moved upwardly or downwardly within opening 52 to adjust the vertical position of the cutter. When the above parts are in properly assembled position, the cutting tool is adapted to project downwardly through the slot 67 in the bottom plate 39 of shoe 38.

The upper end of the vertical arm 30 of each lever 28 is bifurcated to provide spaced ears 68 which straddle a sleeve 69, being pivotally secured thereto by a pin 70. The sleeve 69 is slidably mounted upon a split bolt 71 pivoted at its inner end as at 72 to a metal bar or armature 73, which in turn has a pivotal mounting at its upper end as at 74, with the bracket 75 fixedly carried by the cores 16 of the electro-magnets. Threaded upon the outer end of the split bolt 71 is a nut 76, and encircling the bolt and bearing at one end against the sleeve 69 and at its opposite end against the nut 76 is a compression spring 77 normally tending to urge the sleeve 69 and consequently the upper end of the lever arm 30 inwardly. The pin 70 of course passes loosely through the slot in the bolt 71.

Loosely received through the portion 78 of bracket 75 is a screw 79 having secured to its inner end a tension spring 80, the opposite end of said spring being connected to the bar 73 and acting to normally draw the said bar away from and out of engagement with the cores of the electro-magnets as indicated by the broken lines in Fig. 1. A nut 81 is threaded upon the outer end of screw 79 to adjust the tension of spring 80. Also carried by the portion 78 of bracket 75 is a stop screw 82 which serves to limit the outward movement of the bar 73 about its pivot 74.

In practice, when the electro-magnets 14 are energized, the bar 73 will be drawn inwardly thereby against the action of spring 80, and of course the inward movement of bar 73 will cause the lever 28 to be rocked in a counter-clockwise direction upon pin 31, which will effect a lowering of the cutting diamond 60 into cutting position. However, upon de-energization of the electro-magnets, the spring 80 will function to swing the bar 73 outwardly so as to rock the lever 28 in a clockwise direction and return the cutting diamond to a noncutting position. The spring 77 serves to yieldably maintain the diamond in engagement with the glass during the cutting operation while, at the same time, allowing a limited amount of rocking movement of the lever 28 to take care of any unevenness in the glass surface. In other words, the lever 28 is permitted a slight rocking movement even when the bar 73 is held inwardly by the electromagnets.

In order to facilitate the cutting operation and better the action of the cutting tools, it is desirable to oil the glass sheets or plates along the path to be travelled by the cutting tools. To this end, there is mounted upon the top of the table A between the cutting and receiving sections 11 and 12 respectively, an oiling device designated in its entirety by the numeral 83 and comprising a reservoir 84 adapted to contain a quantity of oil and being supported by studs 85. The oiling device also includes a substantially inverted U-shaped member 86 covered with a wick 87 of suitable material such as felt or the like, the down-turned edges of said wick being immersed within the oil. With such an arrangement, the oil will pass upwardly by capillary attraction into and through the wick.

Also carried by the L-shaped lever 28 of each cutting unit 14 is an arm 88 pivoted to said lever as at 89 and carrying at one end a roller or wheel 90 of felt or some other suitable material. This roller is adapted to rest upon the upper surface of the oiling wick 87 when the table is in its normal inoperative position and when the cutters are lowered into cutting position. One of these rollers is provided for and positioned in alignment with each cutting diamond so that as the table is moved rearwardly through its cutting stroke, the wheels 90 will run over the glass in advance of the cutters and oil the same whereby to facilitate and better the cutting action of the diamonds.

The downward movement of each oiling wheel 90 is limited by a stop pin 91 carried by cross beam 13 and engaging a relatively small pin 92 carried at the adjacent end of pivoted arm 88. The pivot point 89 is so positioned with respect to roller 90 that when the cutters are lowered into cutting position, the said rollers will rest upon wick 87, whereas when the cutters are raised into non-cutting position, the rollers will also be raised upwardly out of contact with the oiling device as shown by the broken lines in Fig. 1, the said arm 88 being swung about its pivot by engagement of the pin 92 with pin 91. The oiling device 83 is preferably disposed slightly beneath the upper surface of the table so that the sheet will not contact therewith during the transfer thereof from the cutting section to the receiving section.

When the machine is in its normal inoperative position with the cutting table A at the forward end of its movement, the said table will assume the position relative to the cutters as disclosed in Fig. 1. After the table has moved rearwardly and the cutting of the glass sheet has been completed, the cut glass is adapted to be shifted from the cutting section 11 of the table onto the receiving section 12 thereof upon the return of the table to its starting position. This is automatically accomplished in the following manner: Thus, there is secured to the cross beam 13 a plurality of spaced brackets 93 and carried by these brackets and extending transversely of the table is a rod 94. Mounted upon the rod at spaced points longitudinally thereof are a plurality of hook members 95, each comprising a body portion 96 having a vertical slot 97 therein for receiving the rod therethrough. Carried at the rear end of the body portion is a roller 98 and extending forwardly from the body portion is a hook 99. The hook members are so constructed that the roller end 98 will overbalance the hook end 99 and will normally hold the hook upwardly in engagement with a rod 100 as shown in Fig. 1. The vertical position of the hook members 95 may be controlled by set screws 101, one being carried by each hook member and adapted to engage rod 94. The hook members are also maintained in properly spaced relation along the rod 94 by means of spacing collars or the like 102 (Fig. 8).

As the glass sheet 10 is carried rearwardly upon the table beneath the hook members, the sheet engaging the rollers 98 will lift the same and thereby rock the said hook members upon rod 94 so as to lower the hooks 99. The hook members will ride over the glass in contact therewith until the cutting table reaches the end of its rearward movement, whereupon the hook ends 99 on the said members will hook over the forward edge of the glass sheet and prevent the sheet from moving forwardly upon the return forward movement of the table. As a result, when the table is again moved forwardly, the glass sheet will be slid from the cutting section 11 of the table onto the receiving section 12 thereof.

As pointed out above, the cutting units 14 are preferably spaced approximately one inch apart throughout the width of the table and, as disclosed in my copending application, are preferably actuated by an operator through the medium of a keyboard positioned adjacent the front of the machine. The keyboard comprises a plurality of keys, one being provided for and connected in circuit with the electro-magnets of the respective cutter so that the said cutters are independently movable at all times into and out of cutting position.

In practice, the operator places the glass sheet 10 to be cut upon the cutting section 11 of the table when the table is in its forward position and, after inspecting the glass, operates the desired key or keys, whereby to cause the energization of the desired magnet or magnets to cause movement of the corresponding cutter or cutters into cutting position. The means for then moving the table is placed in operation and the table moved rearwardly to carry the glass beneath the cutting mechanism B, whereupon those cutters which have been previously moved into cutting position will effect the scoring of the glass sheet along the desired lines. When the table reaches the end of its rearward cutting stroke, the previously energized electro-magnets are adapted to be de-energized so as to cause those cutters in cutting position to be moved upwardly out of cutting position. The table is then moved forwardly to its original starting position to receive another sheet of glass to be cut. Upon forward movement of the table, however, the glass will be automatically transferred from the cutting section 11 of the table to the receiving section 12 thereof by the hook members 95 as explained above.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In glass cutting apparatus, cutting mechanism including a substantially horizontal supporting arm, a shoe carried at the forward end of said arm, means for adjusting the shoe transversely with respect to said arm, a member pivoted to said shoe, a cutter holder carried by said member, a cutter removably carried by said holder, and means for raising and lowering the said holder and cutter carried thereby relative to said shoe.

2. In glass cutting apparatus, cutting mechanism including a substantially horizontal supporting arm, a shoe carried at the forward end of said arm, a member pivoted to said shoe, a cutter holder carried by said member and having an opening therethrough, a cutter removably secured within said opening, and means carried by said holder and engaging said member for raising and lowering the said holder and cutter carried thereby relative to said shoe.

3. In glass cutting apparatus, cutting mechanism including a pivotally mounted substantially horizontal supporting arm, a shoe carried at the forward end of said arm, means for adjusting the shoe transversely with respect to said arm, a member pivoted to said shoe, a cutter holder carried by said member and having an opening therethrough, a cutter removably secured within said opening, and means carried by said holder for raising and lowering the cutter with respect to the glass.

4. In glass cutting apparatus, cutting mechanism including a substantially horizontal supporting arm, a shoe carried at the forward end of said arm, means for adjusting the shoe transversely with respect to said arm, a member pivoted to said shoe and having an opening therethrough, a cutter holder removably received within the opening in said member and in turn having an opening therethrough, a cutter removably received within the opening in said holder, means for securing the holder within said member, and means for securing the cutter within said holder.

5. In glass cutting apparatus, cutting mechanism including a substantially horizontal supporting arm, a shoe carried at the forward end of said arm, means for adjusting the shoe transversely with respect to said arm, a member pivoted to said shoe and having an opening therethrough, a cutter holder removably received within the opening in said member and in turn having an opening therethrough, a cutter removably received within the opening in said holder, means for securing the holder within said member, means for securing the cutter within said holder, and means carried by said holder for raising and lowering the cutter with respect to the glass.

6. In glass cutting apparatus, cutting mechanism including a substantially horizontal supporting arm, a shoe carried at the forward end of said arm, said shoe including an arcuately shaped bottom plate having an opening therein, a member pivoted to the shoe and adapted to rest upon the bottom plate thereof, a cutter holder carried by said member, and a cutter carried by said holder and projecting through the opening in the curved bottom plate of said shoe.

7. In glass cutting apparatus, cutting mechanism including a substantially horizontal supporting arm, a shoe carried at the forward end of said arm, means for adjusting the shoe transversely with respect to said arm, said shoe including an arcuately shaped bottom plate having an opening therein, a member pivoted to the shoe and adapted to rest upon the bottom plate thereof, a cutter holder carried by said member, and a cutter carried by said holder and projecting through the opening in the curved bottom plate of said shoe.

8. In glass cutting apparatus, cutting mechanism including a substantially horizontal supporting arm, a shoe carried at the forward end of said arm, said shoe including an arcuately shaped bottom plate having an opening therein, a member pivoted to the shoe and adapted to rest upon the bottom plate thereof, a cutter holder removably carried by said member, a cutter removably carried by said holder and projecting through the opening in the curved bottom plate of said shoe, and means carried by said holder and engaging said member for raising and lowering the said holder and cutter carried thereby relative to said shoe.

9. In glass cutting apparatus, cutting mechanism including a substantially horizontal supporting arm, a shoe carried at the forward end of said arm, means for adjusting the shoe transversely with respect to said arm, said shoe including an arcuately shaped bottom plate having an opening therein, a member pivoted to the shoe and adapted to rest upon the bottom plate thereof, a cutter holder removably carried by said member, a cutter removably carried by said holder and projecting through the opening in the curved bottom plate of said shoe, and means carried by said holder and engaging said member for raising and lowering the said holder and cutter carried thereby relative to said shoe.

10. In glass cutting apparatus, cutting mechanism including a substantially horizontal supporting arm, a shoe carried at the forward end of said arm, said shoe including an arcuately shaped bottom plate having an opening therein, a member pivoted to the shoe and adapted to rest upon the bottom plate thereof, said member having a substantially vertical opening therethrough, a cutter holder removably received within the opening in said member and also having an opening therethrough, a cutter removably received within the opening in said holder and projecting through the opening in the curved bottom plate of said shoe, means for securing the holder within said member, and means for securing the cutter within said holder.

11. In glass cutting apparatus, cutting mechanism including a substantially horizontal supporting arm, a shoe carried at the forward end of said arm, said shoe including an arcuately shaped bottom plate having an opening therein, a member pivoted to the shoe and adapted to rest upon the bottom plate thereof, said member having a substantially vertical opening therethrough, a cutter holder removably received within the opening in said member and also having an opening therethrough, a cutter removably received within the opening in said holder and projecting through the opening in the curved bottom plate of said shoe, means for securing the holder within said member, means for securing the cutter within said holder, and means carried by said holder and engaging said member for raising and lowering the said holder and cutter carried thereby relative to the shoe.

12. In glass cutting apparatus, cutting mechanism including a substantially horizontal supporting arm, a shoe carried at the forward end of said arm, said shoe including an arcuately shaped bottom plate having an opening therein, a member pivoted to the shoe and adapted to rest upon the bottom plate thereof, said member having a substantially vertical opening therethrough and a cut-out portion communicating with said opening, a cutter holder removably secured within the opening in said member and being provided with a stem received within said cut-out portion, a cutter carried by said holder and projecting through the opening in the curved bottom plate of said shoe, an adjusting screw passing through said stem for securing the cutter in place, and means for adjusting the cutter holder and cutter vertically as a unit relative to said member.

13. In glass cutting apparatus, cutting mechanism including a pivotally mounted substantially horizontal supporting arm, a shoe carried at the forward end of said arm, means for adjusting the shoe transversely with respect to said arm, said shoe including an arcuately curved bottom plate having an opening therein, a member pivoted to the shoe and adapted to rest upon the bottom plate thereof, said member having a substantially vertical opening therethrough and a cut-out portion communicating with said opening, a cutter holder removably secured within the opening in said member and being provided with a stem received within said cut-out portion, a cutter carried by said holder and projecting through the opening in the curved bottom plate of said shoe, an adjusting screw passing through said stem for securing the cutter in place, and means for adjusting the cutter holder and cutter vertically as a unit relative to said member.

14. In glass cutting apparatus, cutting mechanism including a substantially horizontal supporting arm, a shoe carried at the forward end of said arm, means for adjusting the shoe transversely with respect to said arm, a cutter holder pivotally carried by said shoe, and a cutter carried by said holder.

15. In glass cutting apparatus, cutting mechanism including a substantially horizontal supporting arm, a shoe carried at the forward end of said arm, means for adjusting the shoe transversely with respect to said arm, a cutter holder pivotally carried by said shoe, a cutter carried by said holder, and means for raising and lowering the cutter relative to said shoe.

16. In glass cutting apparatus, cutting mechanism including a substantially horizontal supporting arm, a shoe carried at the forward end of said arm, said shoe including a bottom plate having an opening therein, a cutter holder pivotally carried by said shoe, and a cutter carried by said holder and projecting through the opening in the bottom plate of said shoe.

17. In glass cutting apparatus, cutting mechanism including a substantially horizontal supporting arm, a shoe carried at the forward end of said arm, said shoe including a bottom plate having an opening therein, means for adjusting the shoe transversely with respect to the said arm, a cutter holder pivotally carried by said shoe, and a cutter carried by said holder and projecting through the opening in the bottom plate of said shoe.

18. In glass cutting apparatus, cutting mechanism including a substantially horizontal supporting arm, a shoe carried at the forward end of said arm, said shoe including a bottom plate having an opening therein, a member pivoted to the shoe and adapted to rest upon the bottom plate thereof, a cutter holder carried by said member, and a cutter carried by said holder and projecting through the opening in the bottom plate of said shoe.

19. In glass cutting apparatus, cutting mechanism including a substantially horizontal supporting arm, a shoe carried at the forward end of said arm, said shoe including a bottom plate having an opening therein, means for adjusting the shoe transversely with respect to the said arm, a member pivoted to the shoe and adapted to rest upon the bottom plate thereof, a cutter holder carried by said member, a cutter carried by said holder and projecting through the opening in the bottom plate of said shoe, and means for raising and lowering the cutter relative to said shoe.

EDWIN A. ROSIN.